United States Patent [19]
Schwartz

[11] Patent Number: 5,435,916
[45] Date of Patent: Jul. 25, 1995

[54] SOCK FILTER AND RETAINER FOR MOUNTING TO A LIQUID SUPPLY TUBE

[76] Inventor: Harlan A. Schwartz, 212 Huron St., Manitowoc, Wis. 54220

[21] Appl. No.: 192,313

[22] Filed: Feb. 4, 1994

Related U.S. Application Data

[63] Continuation of Ser. No. 955,096, Oct. 1, 1992, abandoned.

[51] Int. Cl.⁶ .................. B01D 29/17; B01D 29/19
[52] U.S. Cl. ........................ 210/232; 210/238; 210/437; 210/448; 210/457; 210/486; 210/489
[58] Field of Search ................. 210/232, 238, 323.2, 210/346, 437, 448, 452, 457, 483, 486, 489; 55/378, 379

[56] References Cited

U.S. PATENT DOCUMENTS

| | | | |
|---|---|---|---|
| 1,249,762 | 12/1917 | Jenkins | 210/238 |
| 2,145,047 | 1/1939 | Goldkamp | 210/437 |
| 3,358,839 | 12/1967 | Simons | 210/232 |
| 4,637,879 | 1/1987 | Hartley | 210/452 |

Primary Examiner—Matthew O. Savage
Attorney, Agent, or Firm—Wheeler & Kromholz

[57] ABSTRACT

An improved filter assembly for filtering liquid, in particular milk. The improved assembly comprises a retainer for connecting the filter assembly to a liquid supply tube, a filter sock, having a predetermined diameter and length, for filtering the liquid, and an internal support coil, having coils of varying pitch, located within and supporting the filter sock, also having a predetermined diameter and length. The internal support coil extends substantially the entire length of the filter sock. The diameter of the filter sock is slightly greater than the diameter of the internal support coil so that the filter sock fits snugly over the internal support coil. The predetermined length of the filter sock is longer than the predetermined length of the internal support coil so that a flexible tab is provided at the open end of the filter sock. The retainer includes a lip for preventing the filter sock and internal support coil from moving away from the pressure of the liquid as it flows out of the liquid supply tube under pressure and through the improved filter assembly.

3 Claims, 3 Drawing Sheets

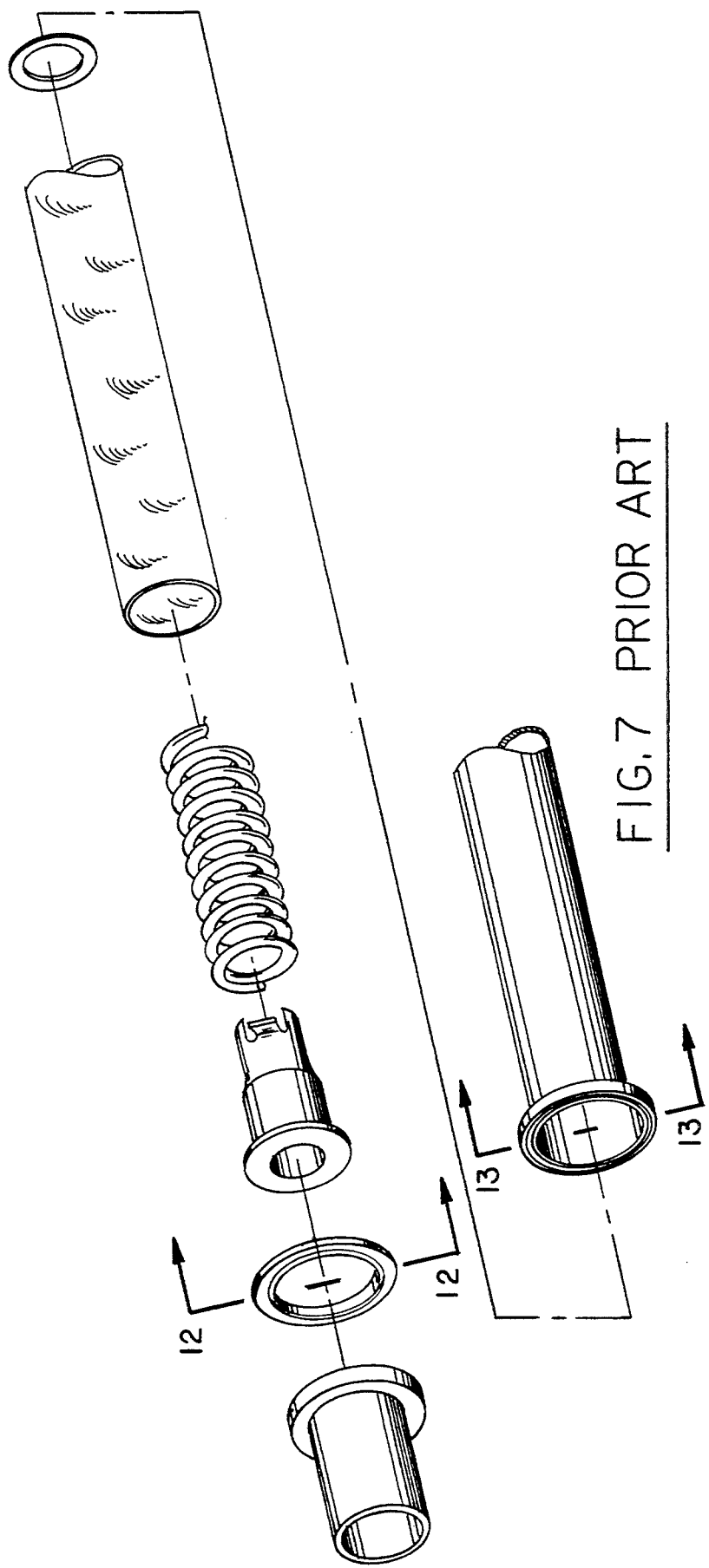
FIG. 7 PRIOR ART
FIG. 13
FIG. 12

SOCK FILTER AND RETAINER FOR MOUNTING TO A LIQUID SUPPLY TUBE

This application is a continuation of application Ser. No. 07/955,096 filed 1 Oct. 1992, now abandoned.

BACKGROUND OF THE INVENTION

The present invention relates generally to the field of liquid filtration and specifically to the field of milk filtration.

In normal dairy processing on a farm milk is filtered by pumping the liquid through tubing containing a filter assembly consisting of a filter sock, a rigid support which keeps the filter sock from collapsing upon itself and a retainer which holds the assembly together and allows it to be attached to the tubing at a junction where two pieces of tubing are joined together.

The typical milk filter assembly (FIG. 2, prior art) is constructed by combining a rubber retainer, a support such as coil, and a filter sock so that they can be inserted into a milk tube and clamped in place. The support coil has two ends and looks like a typical Helical compression spring coil. The filter sock is a tube of filter material having one open end and one closed end. The assembly is made as follows: One end of the support coil is placed inside the inside diameter of the rubber retainer while the other end remains free. The filter sock is then passed over the free end, up the coil, and over the outside of the retainer until it reaches the lip of the retainer. The typical filter sock used in this case does not fit snugly around the circumference of the support and is longer than the frame by about two inches. The filter sock must be wide enough to fit over the retainer which is larger in diameter than the coil. This creates an excess of unsupported filter material around the coil. Next, this excess filter material is rolled around the coil to facilitate placement of the coil in the milk tube. The assembly is now placed inside the milk tube. The open end of the filter sock is secured to the outside surface of the retainer by a friction fit between the inside diameter of the tubing and the outside diameter of the sock supported by the outside diameter of the retainer. This holds the sock in place on the retainer with the support coil inside the sock. The fit of the retainer within the wall of the milk tube is determined by the use of a ferrule surrounding the tubing. How good the fit is depends upon how the ferrule is installed. An expansion tool is normally used to do this; the diameter of expansion and thus fit is determined by the pressure exerted by the user of the expansion tool.

Alternatively, the support may be a circular metal frame with a lip on the one end and a protective metal cap on the other end. (FIG. 8, prior art). Large rectangular open areas allow liquid passage. The filter sock is passed over the cap end up to the lip where it is secured by an O-ring which is essentially a rubber band. Again, the typical filter sock used in this case does not fit snugly around the circumference of the support and is longer than the frame by about an inch. This excess of material allows the pressure of the milk, as it is pumped through the filter media, to push the loose media into open areas where it chafes against the edges of the open areas. The milk pressure alternates on and off in cycles which aggravates this chafing action causing rupture of the media. This structure is typical of the SURGE milk filter assembly sold by the Babson Brothers Company of Oak Ridge, Ill.

Additionally, now referring to FIG. 7, another known type of prior art filter assembly is the DeLaval assembly which is sold by the DeLaval company of Kansas City, Mo. The DeLaval structure has a ferrule that screws onto the coil. The ferrule has a lip for attachment to the tubing at a tubing joint. The other end of the ferrule has a small tooth-like projection that acts as a male thread to allow the to be screwed onto the coil. The coil has a uniform wide pitch except for two to three turns at each end which are more closely pitched. The turns at the first end to act as female threads to allow the ferrule to be screwed on. The turns at the other end are designed to turn the end of the coil so it does not puncture the filter sock. The filter sock is passed over the end of the coil up to the lip of the ferrule where it is secured by an O-ring. The DeLaval coil is subject to objectional compression due to the pressure of the milk flow which allows the excess filter material to insert itself between the coils where it is subject to chafing and breakage. The chafing is aggravated by the sharp edges of the metal ferrule at the attachment point of the ferrule and the coil, as well as the edge of the tooth-like projection.

More importantly, the turns of the coil of the DeLaval structure are quite different from the present invention. In the DeLaval structure the first two turns of the coil are quite close together with the remainder of the turns quite far apart. The consequence of this is that the support structure of DeLaval has a tendency to compress and this compression is undesirable because it can lead to binding and chafing of the filter media. The structure of the present invention avoids this by presenting a filter assembly design having maximum rigidity of support structure and availability of filter surface area.

These types of assemblies, while adequate, suffer from several drawbacks.

First, the diameter of the filter sock or media must be sized to the outer circumference of the retainer to achieve a seal against the inside diameter of the tubing, through which the milk is pumped and to which the filter assembly is attached. However, because the diameter of the support coil is much less than the outside diameter of the retainer there is an excess of unsupported filter media collapsing around the support coil whereby the filter media folds in upon itself forming areas of multiple layers of filter media. This leaves 18 to 20% of the surface area of the filter sock unavailable for effective filtering.

Second, because the filter supports in the field are of varying lengths the filter sock is necessarily longer than the support coil and consequently the support coil does not extend all the way down to the bottom of the filter sock. This leaves about one inch of unsupported filter media which then either folds over the outside of the coil or bunches up around the circumference of the coil. This excess material is available to work its way into the open areas of the coil or support and subject the media to breakage due to chafing.

Third, because the width of the sock is dictated by the necessity of fitting it over the outside of the retainer, the cost of the filter sock is increased and it is impossible to achieve a smooth fit over the support coil.

Fourth, the internal support structure or coil is designed such that it does not take into account the fact that the pressure of the milk on the filter sock or media is not uniform as the milk is pumped through. The pressure increases as the milk flows out toward the opening in the retainer. This is because the opening is narrower in diameter than the tube itself. Because of this it is possible for excess unsupported material to be forced in between gaps in the filter support coil. This causes the filter material to be worked against the surface of the support coil and the rubber retainer such that the filter sock can break causing sediment to be deposited in the milk which decreases the value of the milk.

Fifth, in addition to the above it is known that the filter material from which the filter sock is made swells when exposed to a liquid. This causes a good seal to be formed between the filter material and the pipe but results in making it difficult to easily remove the filter assembly after the milk has been filtered. Typically, a pliers or some other tool must be used to grab on to the filter assembly so that it can be freed from the tube.

The present invention, by means of a unique design, overcomes these problems and provides a stable and longer lasting filter system for the milk fluid. The inventor knows of no prior art which discloses the unique features of the present invention.

DEFINITION OF TERMS

For the purposes of clarity the terms given below shall be interpreted throughout the specification and the claims as having the following definitions. Should there be any contradiction between the meaning given a term herein and its common meaning that term shall be interpreted as having both meanings.

Closed pitch turns: The turns of a coil or similar structure that are in touching or near touching contact with each other.

Substantially closed pitch turns: The turns of a coil or similar structure that are in close proximity to each other but are not in touching or near touching contact with each other.

SUMMARY OF THE INVENTION

My present invention is an improved milk filtration assembly comprising a milk filtration sock, a support coil, and a retainer. The improvement of my assembly is as follows:

1. The filter sock is made slightly longer than the support coil in order to provide a flexible tab. The flexible tab acts as both a leader for threading the filtration sock into and through the retainer, rather than over it, and as a removal tab to allow a person to easily pull the assembly from the tubing through which the milk is supplied.
2. The support coil is designed to be inserted into the sock and to extend all the way to the bottom of the sock so that there is no excess material available at the bottom of the sock.
3. The filtration sock is specifically designed to fit snugly over the support coil. The sock uses less material and fits more tightly over the support coil. In other words the outside diameter of the support coil is slightly less than the inside diameter of the filter sock. This helps to prevent collapse of the sock into the coil because there is less material available and avoids the formation of areas of multiple layers of filter sock media over the coil which prevents filtration and limits the available effective filter area. Consequently, while less material is used, more surface area is available for filtering.
4. The support coil is specifically designed to compensate for the fact that the pressure of the milk or liquid is not constant throughout the length of the filtration sock media; the pressure of the liquid being highest near the retainer opening and lowest near the bottom of the sock. Accordingly, the support coil has a closed pitch for the first several turns of the coil followed by a substantially closed pitch for several more turns of the coil followed by the remainder of the coil where the turns are given an even wider pitch. The coils of the support coil are closed pitch at the end of the coil that is in contact with the retainer structure. This provides maximum support and surface area to form a good seal at that end of the coil. The next series of substantially closed coils are in contact with the portion of the filter sock closest to the retainer. These coils provide direct support to the milk filter sock where the pressure against the filter sock is highest. The remaining coils may be spaced farther apart because the milk pressure is lower. However, the coil or similar support structure should extend all the way to the bottom of the closed end of the filter sock. Consequently, the filtration assembly provides the maximum support along the entire length of the filtration media while at the same time making maximum use of the entire filtration surface area available. The result is that more milk is filtered in less time with breakage of the filtration sock media reduced to an almost nonexistent level.
5. The filtration sock is designed to be slightly longer than the coil so that a portion of the sock, at its open end, extends out beyond the retainer and acts as a tab. The tab allows the entire assembly to be easily pulled out of the milk tube.
6. The coils of the support coil are deburred so that they are smooth. The tip of the end of the coil that is in contact with the closed end of the filter sock is pushed in toward the center of the coil so that only smooth rounded surfaces are in contact with the material of the filter sock. In the known prior art systems a major problem leading to breakage of the filter is the rubbing of the filter material against rough portions of other parts of the assembly; like the coil. The present invention reduces wear upon the sock and prevents accidental breakage thereby increasing the life of the sock as well as the efficacy of the filtering operation.

Alternatively, it is important to note that the use of three different pitches of coils is considered to be preferred because the pressure of the milk is not constant throughout the tube. However, most important is the fact that the pitch of the coils is closed for at least the first few turns of its length and substantially closed for the next several turns of its length. After that, based upon this disclosure, it will be apparent to one of ordinary skill in the art that the exact pitch of the coils may or may not be varied as specifically disclosed by this specification. In fact, although it would not perform as well as the device specifically disclosed herein the pitch of the coils could remain closed or substantially closed the entire length of the coil.

These and other benefits of the present invention will be apparent to one skilled in the art from the following description.

DESCRIPTION OF THE DRAWINGS

FIG. 7 is a view showing the relationship of the parts of a different prior art filter sock assembly.

FIG. 12 is a view from line 12—12 of FIG. 7.

FIG. 13 is a view from line 13—13 of FIG. 7.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention is an improved liquid filter assembly for filtering liquids, specifically milk; although other liquids could be filtered using this type of assembly for the advantages disclosed within this document.

For purposes of simplicity in this description the improved liquid filter assembly will be referred to as the unit 10.

Referring to FIGS. 1, 3, 5, and 6 it may be seen that the unit 10 comprises an internal support coil 20, a filter sock 40, and a retainer 60. Typically, the retainer 60 is made from rubber but any other material suitable for giving support and retention to the system may be used. Preferably the retainer 60 is made out of plastic; one suitable type of plastic is Monsanto SANTOPRENE. This holds up much longer than typical rubber retainers. In function the retainer 60 is held in place by use of a ring clamp (not shown).

Figure 4:
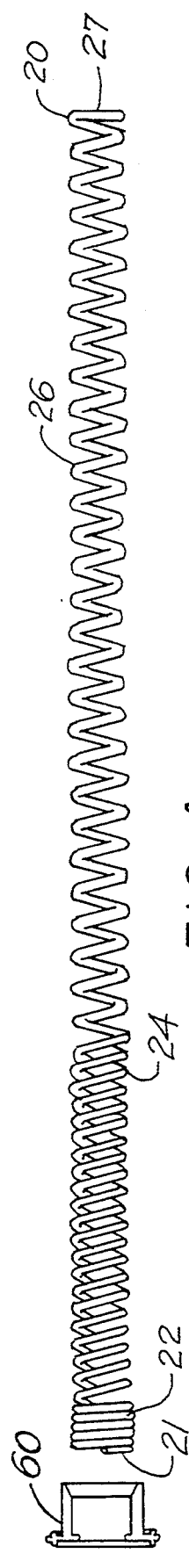
FIG. 4 is a schematic view showing the retainer and the internal support coil.

Referring to FIG. 4 the internal support coil 20 may be seen to comprise three integral sections: a closed pitch section 22, a substantially closed pitch section 24, and a wide pitch section 26. It is important to note that the main purpose of the internal support coil design is to prevent undue compression of the coil 20 with respect to the filter sock and thereby avoid chafing or abrasion of the filter sock 40 material. Accordingly the structure of internal support coil 20 may be of any design or material which offers rigidity sufficient to eliminate compression or chafing of the support structure with respect to the retainer 60 and filter sock 40. Thereby, avoiding damage to the filter sock 40 and increasing the life of the filter sock 40.

Figure 1:
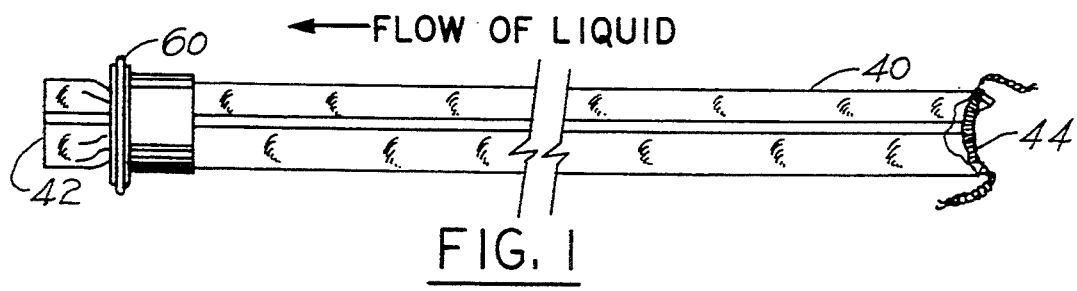
FIG. 1 is a side view of the filter sock assembly of the present invention showing the portion of the open end of the filter sock that extends past the closed pitch end of the coil and the retainer.
Figure 2:
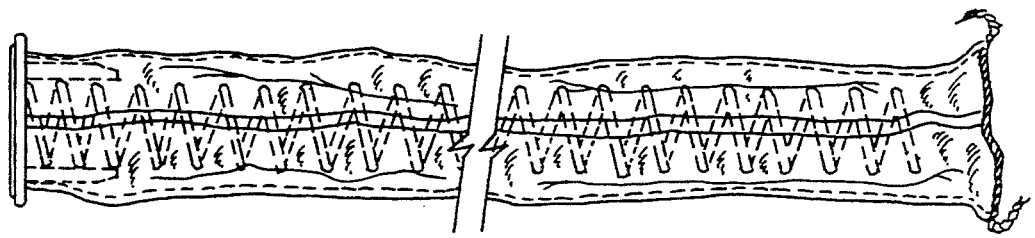
FIG. 2 is a side view of a prior art filter sock assembly.
Figure 3:
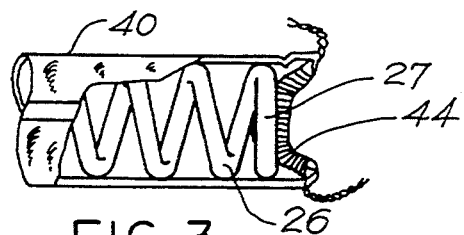
FIG. 3 is a cut away view of the closed end of the filter sock showing the end of the internal support coil having turns of a wide pitch and extending to the bottom of the sock.
Figure 5:
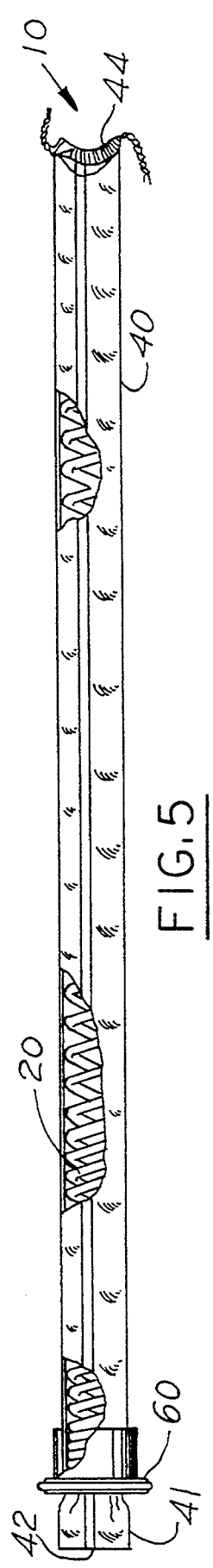
FIG. 5 is a cutaway side view showing the relationship of the sock, the internal support coil, and the retainer.
Figure 8:
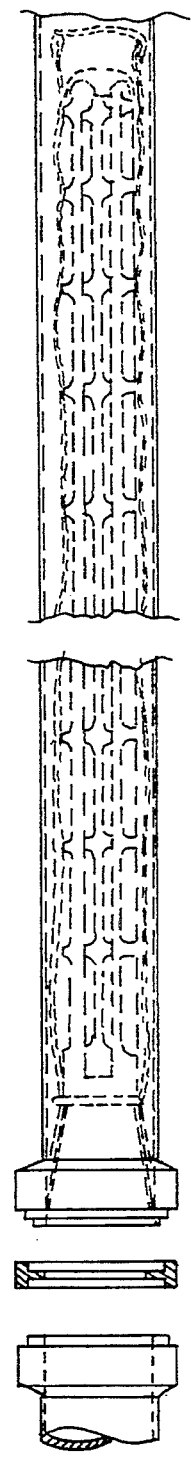
FIG. 8 is a side view of another prior art filter sock assembly.

Referring to FIGS. 1 and 5 it may be seen that the filter sock 40 has an open end 42 and a closed bottom end 44. Further, the filter sock 40 is sized so that the sock 40 will fit snugly over the coil 20. This prevents bunching of the filter material while the unit 10 is in use and consequently allows nearly 100% of the available surface area of the filter sock 40 to be used.

Figure 6:
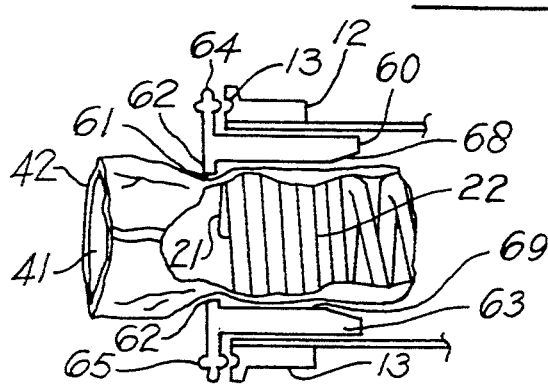
FIG. 6 is a cut away view of the open end of the filter sock showing the relationship of the open end of the filter sock with the retainer and the closed pitch end of the internal support coil.
Figure 9:
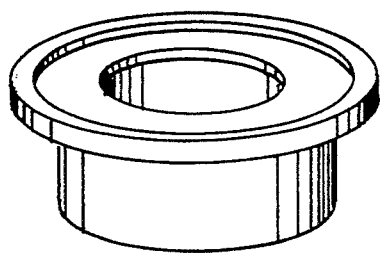
FIG. 9 is a perspective view of an improved rubber retainer for use in a surge type system.
Figure 10:
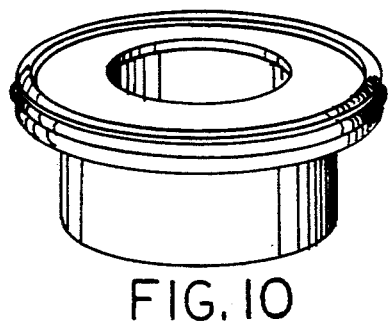
FIG. 10 is a perspective view of an improved rubber retainer for use in a triclamp system.
Figure 11:
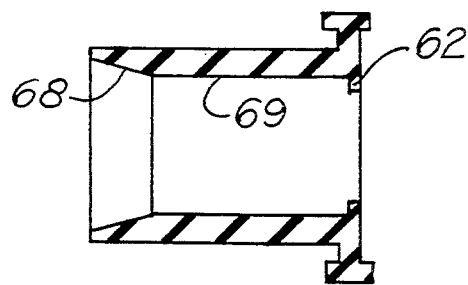
FIG. 11 is a cut away side view showing the inside structure of the improved rubber retainer of the present invention.

Referring to FIGS. 6 (specifically) and 10 (generally) the structure of the retainer 60 may be seen to include a lip 62, an opening 61, a side wall 63, and a flange 64 having a integral gasket 65. The retainer 60 is a new design in that the inside wall 69 of the side wall 63 has a sloped portion 68. This design facilitates the insertion of the coil 20. Further, the design is improved to provide a retaining lip 62. Ideally, the retainer 60 should be sized to hold the spring 20 in position frictionally. The retainer 60 functions to:

1. Prevent the filter sock 40 and internal support coil 20 from being pushed out of the retainer 60 under the pressure of the milk flow; and
2. Act as a gasket at the end of the milk tube 12 to prevent unfiltered milk from leaking out of the milk tube 12.

The unit 10 is assembled and used as follows:

The wide pitch section 26 of the coil 20 is inserted through the open end 42 of the filter sock 40 and the coil 20 is inserted until end 27 of the wide pitch section 26 contacts the closed bottom end 44 of the sock 40.

Referring to FIG. 5, the length of the sock 40 is greater than the length of the support coil 20. After the coil 20 has been inserted into the sock 40 there is about one inch of extra sock material 41 at the open end 42 of the sock 40 that extends past the end 21 of the closed pitch section 22 of the support coil 20. The extra sock material 41 acts as a leader to thread the sock 40 through the opening 61 and the lip 62 of the retainer 60. The leader 41 is pulled through the opening 61 until the end 21 of the coil 20 contacts the lip 62 of the retainer 60.

Once assembled the unit 10 is inserted into the milk tube 12 as shown in FIG. 6.

Referring to FIG. 6, the side wall 63 of the retainer 60 is sized to fit loosely inside the milk tube 12 through which the milk is pumped. The retainer 60 is designed to fit loosely because most ferrules of milk tubes 12 are rolled on the job by using an expansion tool. Accordingly, there is a lack of standardization in ferrule size.

The retainer wall 63 of the present invention is designed to compensate for this lack of conformity by providing generous clearance so that even the smallest ferrule size is accommodated.

The outer flange 64 and the integral gasket 65 seal up against the end 13 of the milk tube 12 to prevent leakage.

Once the milk flow is turned on the lip 62 prevents the sock 40 and the coil 20 from being pushed through the retainer 60 through the opening 61 of the retainer 60.

After the milk has been filtered the assembly 10 may be removed and the extra sock material 41 is used as a tab that may be easily gripped to pull the assembly 10 free of the milk tube 12.

The foregoing is considered as illustrative only of the principles of the invention. Furthermore, since numerous modifications and changes will readily occur to those skilled in the art, it is not desired to limit the invention to the exact construction and operation shown and described.

What is claimed is:

1. A filter assembly for filtering liquid supplied to the assembly from a liquid supply tube, the filter assembly comprising: a filter sock adapted to be positioned within said liquid supply tube for filtering said liquid, said filter sock having a predetermined diameter and length and an open end and a closed end;

a retainer for connecting the open end of said filter sock to an end of the liquid supply tube, the retainer having an opening and having an annular lip located within the opening;

an internal support coil, having a predetermined diameter and length, for supporting the filter sock;

the internal support coil located within the filter sock;

the diameter of the filter sock being slightly greater than the diameter of the internal support coil;

the open end of the filter sock, having the internal support coil therein, being inserted through the retainer opening until an end of the internal support coil comes into stopping contact with the annular lip;

the predetermined length of the filter sock being longer than the predetermined length of the internal support coil to provide a flexible tab, at the open end of the filter sock, for acting as a leader to thread the filter sock into the retainer and as a removal tab to pull the filter assembly from the liquid supply tube;

the flexible tab extending through the retainer opening.

2. The filter assembly of claim 1 in which the opening in the retainer further includes an internal wall having a smooth non-threaded sloped portion;

the smooth non-threaded sloped portion being substantially funnel shaped to allow for easy placement of the filter sock and the internal support coil into the retainer opening.

3. A filter assembly for filtering liquid supplied to the assembly from a liquid supply tube, the filter assembly comprising: a filter sock means adapted to be positioned within said liquid supply tube for filtering said liquid, said filter sock means having a predetermined diameter and length and an open end and a closed end;

a retainer means for retaining the filter sock means in the liquid supply tube;

the retainer means having an opening, the opening having an annular lip;

an internal coil means, located within the filter sock means, for supporting the filter sock means, the internal coil means also having a predetermined diameter and length;

the diameter of the filter sock means being slightly greater than the diameter of the internal coil means;

the predetermined length of the filter sock means being longer than the predetermined length of the internal coil means to provide a flexible tab means, at the open end of the filter sock means, for acting as a leader to thread the filter sock means into the retainer means opening and as a removal tab to pull the filter assembly from the liquid supply tube;

the open end of the filter sock means, having the internal coil means therein, inserted into the retainer means until an end of the internal coil means comes into stopping contact with the annular lip;

the flexible tab means extending through the retainer means opening.

* * * * *